United States Patent
Biske

(10) Patent No.: US 8,620,788 B2
(45) Date of Patent: Dec. 31, 2013

(54) SYSTEM AND METHOD FOR DYNAMIC FINANCIAL ACCOUNT MANAGEMENT

(75) Inventor: Justin E. Biske, Glastonbury, CT (US)

(73) Assignee: Hartford Fire Insurance Company, Hartford, CT (US)

(*) Notice: Subject to any disclaimer, the term of this patent is extended or adjusted under 35 U.S.C. 154(b) by 0 days.

(21) Appl. No.: 13/416,372

(22) Filed: Mar. 9, 2012

(65) Prior Publication Data

US 2013/0238487 A1    Sep. 12, 2013

(51) Int. Cl.
G06Q 40/00    (2012.01)

(52) U.S. Cl.
USPC .............................................. 705/35; 705/39

(58) Field of Classification Search
USPC ....................... 705/35, 39, 40, 38; 235/379
See application file for complete search history.

(56) References Cited

U.S. PATENT DOCUMENTS

| | | | |
|---|---|---|---|
| 7,606,721 B1 * | 10/2009 | Donnelly et al. .................. 705/2 |
| 7,606,750 B1 | 10/2009 | Hoag et al. |
| 7,689,507 B2 | 3/2010 | Hung et al. |
| 7,761,381 B1 * | 7/2010 | Fitch et al. ....................... 705/44 |
| 7,860,744 B2 | 12/2010 | Libman |
| 7,885,870 B2 * | 2/2011 | Nam et al. ...................... 705/35 |
| 7,899,750 B1 * | 3/2011 | Klieman et al. ................. 705/40 |
| 7,953,653 B2 * | 5/2011 | Siggers et al. .................. 705/35 |
| 8,069,113 B2 * | 11/2011 | Elterich .......................... 705/39 |
| 8,095,436 B1 | 1/2012 | Shah et al. |
| 8,118,668 B2 * | 2/2012 | Gagner et al. .................. 463/25 |
| 8,209,246 B2 * | 6/2012 | Lawrence ....................... 705/35 |
| 8,229,850 B2 * | 7/2012 | Dilip et al. ...................... 705/40 |
| 2005/0137953 A1 * | 6/2005 | McDonough et al. .......... 705/36 |
| 2006/0069642 A1 * | 3/2006 | Doran et al. .................... 705/39 |
| 2007/0118459 A1 * | 5/2007 | Bauerschmidt et al. ........ 705/37 |
| 2007/0198382 A1 * | 8/2007 | Ferrari ............................ 705/35 |
| 2009/0276368 A1 | 11/2009 | Martin et al. |
| 2009/0319411 A1 | 12/2009 | Debie et al. |
| 2010/0174649 A1 * | 7/2010 | Bouchard ........................ 705/44 |
| 2010/0228669 A1 * | 9/2010 | Karim ............................. 705/42 |
| 2010/0241557 A1 | 9/2010 | Galit et al. |
| 2010/0280935 A1 * | 11/2010 | Fellowes et al. ................. 705/35 |
| 2010/0299251 A1 * | 11/2010 | Thomas ......................... 705/39 |
| 2010/0299252 A1 * | 11/2010 | Thomas ......................... 705/39 |
| 2010/0299260 A1 * | 11/2010 | Thomas ......................... 705/44 |
| 2010/0324986 A1 * | 12/2010 | Thomas .................... 705/14.27 |
| 2010/0325036 A1 * | 12/2010 | Thomas ......................... 705/38 |
| 2010/0332339 A1 * | 12/2010 | Patel et al. ..................... 705/26 |
| 2011/0004514 A1 * | 1/2011 | Thomas .................... 705/14.17 |
| 2011/0004546 A1 * | 1/2011 | Thomas ......................... 705/39 |
| 2011/0010203 A1 * | 1/2011 | Wottowa et al. ................. 705/4 |

(Continued)

OTHER PUBLICATIONS

Anonymous "On Track M Power Provides a New Way of Manageing Money as Holiday Season Approaches" Nov. 16, 2005 PR Newswire (US).*

(Continued)

*Primary Examiner* — Kelly Campen
(74) *Attorney, Agent, or Firm* — Howard IP Law Group, PC

(57) ABSTRACT

A predictive financial data management system for efficiently and intelligently administering and managing allowance and diversionary accounts and associated sub-accounts based on third party transaction data and user defined sub-account prioritizations. The system is configured to interface with third party data to conduct the financial administration and management and rebalancing of the allowance and diversionary accounts based on input from a predictive model and historical transaction data.

18 Claims, 8 Drawing Sheets

(56) References Cited

U.S. PATENT DOCUMENTS

2011/0071934 A1    3/2011   Brown et al.
2011/0087594 A1*   4/2011   Bierer et al. .................. 705/44
2011/0106691 A1*   5/2011   Clark et al. ................... 705/38
2011/0119169 A1*   5/2011   Passero et al. ................ 705/35
2011/0137794 A1*   6/2011   Ferrari et al. ................. 705/42
2011/0307366 A1*   12/2011  Ahuja et al. .................. 705/37
2012/0030109 A1*   2/2012   Dooley Maley et al. ....... 705/44

OTHER PUBLICATIONS

Tripp, Julie "Managing Your Money" Jan. 8, 2006 The Oregonian, Portland Oregon.*
Anonymous "Customer XPS A Software With a Human Touch" Sep. 12, 2011, Economic Times.*

* cited by examiner

SYSTEM AND METHOD FOR DYNAMIC FINANCIAL ACCOUNT MANAGEMENT

BACKGROUND

Diligent financial planning and portfolio management are critical in today's economy. The volatility of today's economy now demands a high degree of discipline and attention to one's investments for college, retirement and other long term goals. Conventionally, in managing an investment portfolio, the key decisions revolve around how to allocate portfolio assets among different asset classes such as stocks, bonds and cash. Generally, asset allocation is easier to manage with respect to investing for more long term investments such as college savings and retirement. Typically, investment strategies for these long term investments take into account factors such as fluctuations in the investor's income over time, market volatility, the possibility of outliving one's assets, and inflation risk.

By way of background, a conventional response to the problem of setting long term investment strategies has been to follow a so-called "glide path", which is a year-by-year process of adjusting a portfolio's asset allocation according to the investor's age. The typical glide path shifts the portfolio toward conservative, fixed-income assets and away from riskier, equity-like assets as the investor grows older. Additionally, there are numerous investment funds known as "target funds" or "target date funds" that may perform this reallocation automatically over time.

However, these conventional investment planning strategies such as the glide path fail to take into account more short term spending and saving transactions on an individual level. Furthermore, conventional investment and portfolio management methodologies do not provide the ability to plan down to the monthly, weekly and even daily level. For example, more micro-level or short term financial expenditures such as eating out, gas, retail purchases, etc. are not accounted for in conventional financial planning and investment management. Generally, more conventional long term based investment planning cannot account for such purchases made since they focus more on macro level financial transactions and time frames.

Accordingly, it would be desirable to have a system that can accurately track both short term and long term financial transactions and goals in a manageable and accurate manner. It would be further desirable to have a system that could also provide intelligent recommendations and related portfolio re-allocation to achieve one's financial goals and priorities in a real time basis.

SUMMARY

In one embodiment, the present invention is a system for managing financial data related to an allowance account and a diversionary account for one or more users, comprising a communications interface for receiving user data related to a plurality of allowance account and diversionary account designations, each allowance account designation corresponding to at least one spending related sub-account and each diversionary account designation corresponding to at least one savings related sub-account, each spending and savings related sub-account further having an associated priority rating provided by the user; a data storage device for storing the received data related to the plurality of allowance account and diversionary account designations; a computer processor for executing program instructions to: receive, via the communications interface, data related to a third party financial transaction; correlate the third party financial transaction data with at least one of the plurality of sub-accounts; determine one or more allowance account and diversionary account rebalancing transactions based upon the correlated sub-account for the third party financial transaction and the associated priority rating of the sub-account; and transmit data related to the rebalancing transactions to a financial account management system for execution.

In one embodiment, the present invention is a computer system for managing allowance and diversionary account financial data, comprising a processor; and a memory storage device in communication with the processor; the processor adapted to receive via a computer communications network an allowance account based transaction from a third party entity; access, from the memory storage device data associated with a plurality of allowance and diversionary sub-accounts; correlate the allowance account based transaction with one or more of the allowance and diversionary sub-accounts; determine, based on the correlation, one or more re-balancing transactions for one or more of the allowance and diversionary sub-accounts; and provide an output signal containing instructions related to the execution of one or more of the re-balancing transactions, the output signal including a request for one or more financial services/insurance products.

In one embodiment, the present invention is a computer-implemented method for administering financial-related data associated with an allowance account and a diversionary account, comprising receiving, via a communications interface, user data related to a plurality of allowance account and diversionary account designations, each designation corresponding to at least one spending related sub-account or one savings related sub-account and each designation further having an associated priority rating associated with each sub-account; storing, via a data storage device the received data related to the plurality of allowance account and diversionary account designations; receiving, via the communications interface, data related to a third party financial transaction; storing, via a data storage device, the data related to the third party financial transaction; correlating, via the computer processor, the third party financial transaction data with at least one of the plurality of sub-accounts based on the comparison; determining, via the computer processor one or more sub-account rebalancing transactions based on the correlated data and the associated priority rating; receiving, via the communications interface, one or more financial/insurance product offerings to accomplish the determined rebalancing transactions; and receiving a selection of one or more of the financial/insurance product offerings.

BRIEF DESCRIPTION OF THE DRAWINGS

A more detailed understanding may be had from the following description, given by way of example in conjunction with the accompanying drawings wherein.

DETAILED DESCRIPTION

Figure 1:
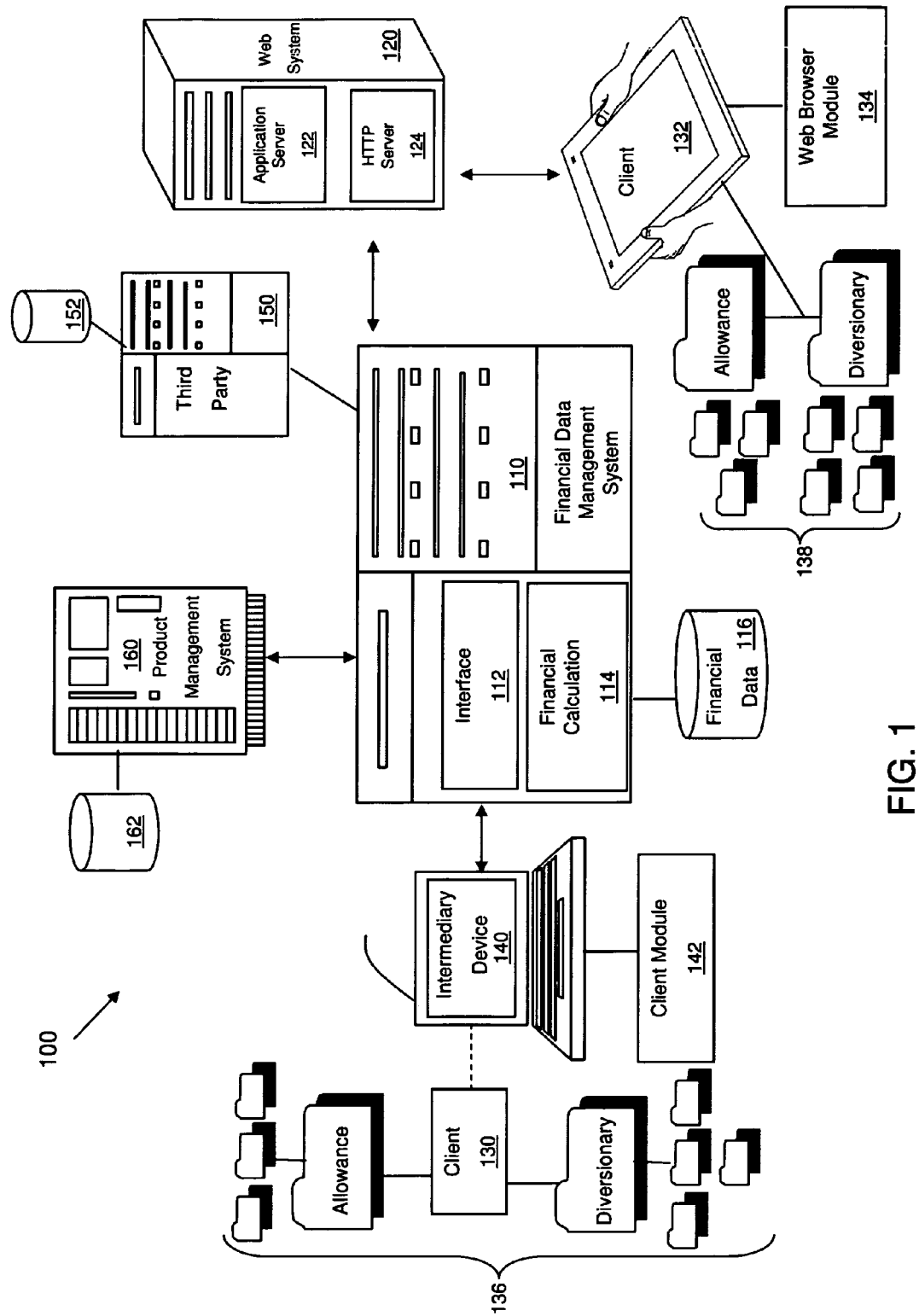
FIG. 1 shows an exemplary computer architecture that may be used for the efficient allowance and diversionary account management.

Disclosed herein are processor-executable methods, computing systems, and related technologies for the management, tracking and communication of allowance and diversionary based financial data and related information. As used herein, the term "allowance account" is associated with a so-called short term type account such as a checking account and the term "diversionary" is associated with more of a long term type account such as a savings type account. Additionally, in some embodiments, the allowance accounts may be linked to one or more checking accounts and the diversionary accounts may be linked to one or more savings accounts. The allowance accounts may also be linked to one or more debit type cards, debit checking accounts, e-checks, or other similar types of payment methods. An allowance account may include one or more sub-accounts for particular purposes. More than one sub-account of an allowance account may be linked to a single checking or other short term account or payment method. Diversionary accounts may similarly include one or more than one diversionary sub-accounts, and multiple diversionary sub-accounts may be linked to a single savings account. The present invention allows for the short term and long term management of finances using an intelligent predictive system. Using the system, an individual can plan for purchases such as a new house or a new car, and the system will help allocate and manage funds on a weekly, daily and even hourly basis to help accomplish the user's various goal(s) within user defined priorities and time frames. For example, if the user's goal is to purchase a house in five years, the system may automatically manage and rebalance the user's allowance and diversionary accounts to enable the user to purchase the home in this time frame in tandem with the other user goals and priorities. This may entail, re-prioritizing one or more of the user's short term and long term goals to facilitate the purchase of the home as well as the strategic selection of certain financial services, which may include insurance products to meet the requirements of the home purchase.

The system of the present invention may be managed by one or more insurance or other financial services entities to assist individuals in managing their short and long term finances. Generally, an individual may use the system to manage their day to day or short term financial transactions and goals as well as their more long term financial transactions and goals. Insurance and/or financial services companies, their agents and other entities involved in the sale of insurance and financial services products may use the present invention to accurately and efficiently recommend certain insurance products for sale to these individuals in line with those individuals' allowance and diversionary account transactions, priorities and goals. Individuals will benefit by having their short and long terms goals synchronized so that even micro-level purchases will be accounted for in their more macro-level financial management. Individuals may also access and use the system directly to help determine which insurance and financial products, such as stocks, bonds, annuities, mutual funds, life insurance, etc. are suitable for them and can execute transactions based on intelligent recommendations of the system in view of each individual's allowance and diversionary account priorities.

FIG. 1 shows an example architecture 100 that may be used for the management, tracking and processing of financial related information and documents that relate to an individual's allowance and diversionary accounts. The example architecture 100 may include a financial data management system 110, a web system 120, a consumer/client entity 130, an intermediary device 140 and a product management system 160. In the example architecture 100 of FIG. 1, the financial data management system 110 and the product management system 160 may be under the control of an insurance/financial services company and their associated agents/brokers. In other embodiments, financial data management system 110 may be integrated with product management system 160. Generally, in operation, financial data management system 110 will receive and process the client 130's financial transactions and goals and interface with product management system 160 to re-allocate, modify and buy and sell certain insurance and financial products dynamically to accomplish client 130's short term and long terms goals. Client 130 may be a personal computer, smartphone, tablet computer, Personal Data Assistants type device, cellphone, internet enabled television, ultra-mobile Personal Computer, laptop or other similar device capable of receiving and transmitting data. Associated with client 130 is a collection of allowance and diversionary accounts and sub-accounts 136 for managing the client's spending and investments in a short and long term basis. Client 130 may be under the control of an individual, group, partnership, business, couple or other combination of entities.

Referring still to FIG. 1, the financial data management system 110 may include a communications interface module 112, a financial calculation module 114, and a financial management database 116. The financial calculation module 114 may include one or more software modules or objects and one or more specific-purpose processor elements to perform the calculations and processing required by the present invention. In some embodiments, the financial calculation module 114 may also include one or more business rules and one or more predictive models. The business rules may provide guidelines on how to categorize or correlate financial transaction data to a client's sub-accounts and also guidelines on how to rebalance and reallocate funds and priorities among the various subaccounts. For example, a business rule may be implemented to elevate or raise the priority of one or more sub-accounts based on activity in one or more other sub-accounts. Conversely, a business rule may be implemented to reduce or lower the priority of one or more sub-accounts based on activity in one or more other sub-accounts. Additionally, other business rules may be implemented, such as a business rule that provides for transferring an excess amount in one or more sub-accounts to one or more other sub-accounts based on the respective sub-account priority. Another business rule may be implemented whereby a shortage or shortfall in one or more sub-accounts may be replenished by transferring funds from one or more other sub-accounts with a lower priority rating. Another business rule may be implemented whereby a shortage or shortfall in one or more sub-accounts may be replenished by transferring funds from one or more other sub-accounts having a lowest prior rating among other sub-accounts. Yet another business rule may establish priority rules such as limiting the range of priority for certain sub-accounts, such as preventing a utility sub-account from being designated a low priority and/or a rule preventing a vacation account being designated the highest priority. Other sub-accounts that may be prevented from being designated a lowest priority include other sub-accounts having fixed payments, such as sub-accounts for loans with fixed repayments schedules, such as repayment of loans for purchase money for homes (generally referred to as mortgage payments) and vehicles. Rules for certain sub-accounts may be determined based on nature of financial products associated with the sub-accounts. For example, a sub-account for premium payments for a term life insurance policy may be prevented from being given a lowest priority, as the amount of such payments are typically fixed. By way of example, a sub-account for premium payments for a universal life insurance policy may be permitted to have a lowest priority, as such policies generally permit flexible payments. Other business rules may be implemented to accomplish the client's goals and priorities in accordance with the present invention.

Business rules may be stored in memory and accessed by system processors for determining which sub-accounts funds may be transferred to in the event of an excess of funds in a subaccount. For example, business rules may designate that certain sub-accounts cannot receive transfers, notwithstanding having a high priority. Sub-accounts for payments for periodic services not capable of prepayment, such as utilities, may be prohibited by business rules from receiving transfers.

In embodiments, sub-accounts may have associated funding amounts. The funding amounts may be user-selected, determined using analysis of historical and current data as to billing and payments, or a combination of those factors and/or other factors. The funding amounts may be associated with time periods. For example, each sub-account may be funded according to determined values on repeating time periods, such as weekly, bi-weekly, monthly, quarterly or annual time periods. Funding time periods may be based on a time period of available funds, such as a monthly, semi-monthly or bi-weekly pay periods.

Funding amounts may be determined based on data such as paycheck data, interest data, planned distributions or withdrawals from annuities or other investments, or other data for example. Business rules may provide, for example, that the sum of all sub-account funding for a bi-weekly pay period equal a net paycheck amount after deductions. Other amounts, such as interest payments, scheduled annuity payments from an immediate annuity or from a deferred annuity during a payout phase may also be included in a sum of all sub-account funding. Thus, each sub-account may have a balance at any time, the balance being incremented as funds are deposited into a linked account, such as a checking account with a third party financial institution, from paychecks, annuities, investment interest or other sources.

In embodiments, priorities may be set for sources of funding. For example, a first source of funding may be a checking account, a lower priority source of funding may be a money market account with check writing capabilities, a still lower priority source of funding may be savings accounts, such as annuity accounts. Business rules may be provided for selection of sources of funding. For example, a deferred annuity account may have a maximum amount available for withdrawal during a time period consistent with a guarantee; a user may set a high priority to use of the deferred annuity as a source of funding so long as withdrawals are within guarantee limits, such as an annual limit or a periodic fraction, such as a monthly limit of $1/12$ the annual limit, and a very low priority to withdrawals in excess of the limit under the guarantee.

In operation, the financial calculation module 114 may receive client input data such as allowance and diversionary account designations, goals and priorities and, using one or more financial guidelines, historical data, rules, templates, regulations, etc., and may generate customized financial document(s) and instructions based on the input data. Such documents and instructions may include, for example, online forms for the trading/purchase and sale of certain insurance/financial services products and/or instructions related to the purchase and sale of such products. Financial calculation module 114 may also output one or more recommendations for one or more insurance/financial services products for review and approval by the user before any trades or transactions are executed. The recommendations may take into account the user's account priorities, social network data related to the user and the characteristics of the financial service/insurance product such as the fees associated with the product, the term and rate of each product and other related factors.

The financial management database 116 may store information such as the short and long term financial related transaction data, account designation and prioritization data, and historical transaction data related to client 130. The short and long term financial transactions related to client 130 may be provided to financial management system 110 either directly from client 130 or via intermediary device 140. Database 116 may also include short and long term financial goals related to client 130 which may also be provided to financial management system 110 either directly from client 130 or via intermediary device 140. Financial management database 116 may be spread across one or more computer-readable storage media, and may be or include one or more relational databases, hierarchical databases, object-oriented databases, one or more flat files, one or more spreadsheets, and/or one or more structured files. Financial management database 116 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communication between the financial data management system 110 and the other elements in the example architecture 100 of FIG. 1 may be performed via the communications interface module 112 in the financial data management system 110. The financial data management system 110 may also access third party systems 150 and third party data 152 which may include client purchase transactions, checking and savings data, credit history, social network history and activity and other sources of information which may impact the financial determinations and transactions herein. For example, financial data management system 110 may interface with computer systems associated with one or more third party sites to receive purchase transaction data related to client 130 such as the client's purchases of retail goods, commodities, services or other types of items. For example, third party sites may include e-commerce sites, utility provider sites, automobile sites, real estate sites and other variety of sites that engage in financial transactions over the Internet. Financial data management system 110 may further interface with computer systems associated with retailers storing data related to user purchases in any manner, such as via brick and mortar stores or the Internet, the data being associated with the user in any manner, including credit card data, loyalty or bonus card data, or other data. Financial data management system 110 may further receive data indicative of likelihoods of the user having a change in circumstance, and apply business rules, and then provide suggestions based on the business rules. By way of non-limiting example, financial data management system 110 may receive data indicative of a likelihood of a customer being pregnant. Business rules may be implemented that provide for, responsive to a customer having a likelihood of pregnancy score above a threshold, communicating offers and suggestions for associated financial products, such as life insurance, increases in death benefits of existing life insurance, savings programs for education expenses, savings programs for a larger home, and associated changes to sub-accounts, such as new or modified sub-accounts corresponding to insurance premiums, payments to educational savings accounts or programs, or to accounts designated for savings for a new or larger home.

Referring still to FIG. 1, the product management system 160 may perform functionality such as storing and processing information related to certain insurance and/or financial services products. For example, the product management system 160 may include information on certain types of variable products such as stocks, mutual funds and certain types of life insurance. The product management system 160 may also process information related to annuity-type products, such as fixed and income annuities and their respective product features such as premiums, rates, income access, payout periods, income start dates, and flexibility of payment types and fees. The product management system 160 may also store information related to fixed income or interest type products such as Certificates of Deposit (CDs), bonds and other similar types of products as well as information on types of savings accounts, checking accounts, money market accounts, etc. The product management system 160 may store this information in a product management database 162. The product management database 162 may also be spread across one or more computer-readable storage media, and may be or include one or more relational databases, hierarchical databases, object-oriented databases, one or more flat files, one or more spreadsheets, and/or one or more structured files. As will be described in further detail below, the financial data management system 110 may use information from the product management database 162 to select and purchase or sell potential products which may be suitable for one or more clients based on their short term and long term transactions and goals.

Referring still to FIG. 1, intermediary device 140 may be a computer or other type of data processing device or computing device, and may include a client intermediary device, retail store employee device, a bank teller device, a broker or agent device or a device operated by an employee of a financial services or insurance company. The intermediary device 140 may include a client module 142, which may be or include a web browser application, a specific-purpose client application, and/or any other appropriate type of application. The intermediary device 140 may receive input from input devices (not depicted) that are included in or connected to the intermediary device 140. These input devices may include, for example, a keyboard, a mouse, or a touch screen, and provide data that indicates the input to the client module 142. The client module 142 coupled to the intermediary device 140 may communicate with the interface module 112 in the financial data management system 110. As one example, an operator of the intermediary device 140, such as a insurance/financial services agent/broker, may provide input data to the agent client module 142 that indicates that certain financial information in the financial management database 116 needs to updated, for example, such as based on a new short and/or long term goals provided by client 130. The agent client module 142 may communicate this data to the interface module 112 in the financial data management system 110, which may then update the financial management database 116 accordingly.

Further, the client module 142 may communicate with the financial calculation module 114 in the financial data management system 110. As one example, an operator of the agent client module 142 may receive an inquiry from an insurance consumer/client for information related to an insurance product such as a fixed income type of product. The operator of the agent client module 142 may compile information related to the request, such as an identifier of the client or consumer, information describing the requested product, and/or other information. This information may be part of a product purchase application which is concurrently completed for submission to the insurance entity. The agent client module 142 may then communicate this information to the financial calculation module 114 via the interface module 112 in the financial data management system 110.

Referring still to FIG. 1, a web site system 120 may provide a web site that may be accessed directly by a consumer operating a user client device 132. User client device 132 can include, but is not limited to cellular telephones, other wireless communication devices, personal digital assistants, pagers, laptop computers, tablet computers, smartphones, or combinations thereof. Associated with client 132 is a collection of allowance and diversionary accounts and sub-accounts 138 for managing the client's spending and investments in a short and long term basis. In the present invention, user client device 132 may communicate with the web site system 120 that may be operated by or under the control of a financial services/insurance entity or other third party entity. The web site system 120 may generate one or more web pages for access by consumer client device 132, and may receive responsive information from the consumer client device 132. The responsive information may include information that identifies the consumer, financial transactions related to the consumer's allowance and diversionary accounts information, information related to the product(s) that the consumer is viewing, purchase, selling or requesting, financial type information, and/or other related types of information. The web site system 120 may then communicate this information to the financial management system 110 for processing via communications interface 112. The web site system 120 may also communicate one or more web pages to the consumer client device 132 that provide one or more product options that may be suitable for the consumer, such as one or more variable type products or fixed and/or income type options from product management system 160.

In operation, client device 132 may be used to approve and/or select one or more of the product options in accordance with their priorities and goals related to their allowance and diversionary accounts. Selection via client device 132 may be accomplished via a touch-sensitive touch screen that provides an input interface and an output interface between the client device 132 and the client or user. The client device 132 displays visual output to the user for manipulation by the user. The visual output may include graphics, text, icons, video, and any combination thereof. In some embodiments, some or all of the visual output may correspond to sub-account representations or icons, further details of which are described below.

The web site system 120 may include a HyperText Transfer Protocol (HTTP) application server module 124 and a financial web application module 122. The HTTP server module 124 may implement the HTTP protocol, and may communicate HyperText Markup Language (HTML) pages and related data from the web site to/from the consumer client device 130 using HTTP. The HTTP server module 124 may be, for example, a Sun-ONE Web Server, an Apache HTTP server, a Microsoft Internet Information Services (IIS) server, and/or may be based on any other appropriate HTTP server technology. The web site system 120 may also include one or more additional components or modules (not depicted), such as one or more switches, load balancers, firewall devices, routers, and devices that handle power backup and data redundancy. The financial web application module 122 may generate the web pages that make up the web site and that are communicated by the HTTP server module 124. The financial web application module 122 may be implemented in and/or based on a technology such as Active Server Pages (ASP), PHP: Hypertext Preprocessor (PHP), Python/Zope, Ruby, any server-side scripting language, and/or any other appropriate technology.

Referring still to FIG. 1, the consumer client device 132 may include a web browser module 134, which may communicate data related to the web site to/from the HTTP server module 124 and the financial web application module 122 in the web site system 120. The web browser module 134 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 134 may implement Rich Internet Application (RIA) and/or multimedia technologies such as Adobe Flash, Microsoft Silverlight, and/or other technologies. The web browser module 134 may implement RIA and/or multimedia technologies using one or web browser plug-in modules (such as, for example, an Adobe Flash or Microsoft Silverlight plugin), and/or using one or more sub-modules within the web browser module 134 itself. The web browser module 134 may display data on one or more displays that are included in or connected to the consumer client device 132, such as a liquid crystal display (LCD) display, organic light-emitting diode (OLED) display, touch screen or monitor. The consumer client device 132 may receive input from the user of the consumer client device 132 from input devices (not depicted) that are included in or connected to the consumer client device 132, such as a keyboard, a mouse or other pointing device, or a touch screen, and provide data that indicates the input to the web browser module 134.

The example architecture 100 of FIG. 1 may also include one or more wired and/or wireless networks (not depicted), via which communications between the elements 110, 120, 130, 132, 140, 150 and 160 in the example architecture 100 may take place. The networks may be private or public networks, and/or may include the Internet. In one example deployment scenario, the financial data management system 110, web site system 120, financial intermediary device 140 and product management system 160 may communicate via one or more private networks that are under the control of the financial services/insurance company, while the consumer client device 132 may communicate with the web site system 120 via the Internet.

Each or any combination of the modules 112, 114, 122, 124, 134 and 142 shown in FIG. 1 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules 112, 114, 122, 124, 134 and 142 may perform functionality described later herein.

Figure 2:
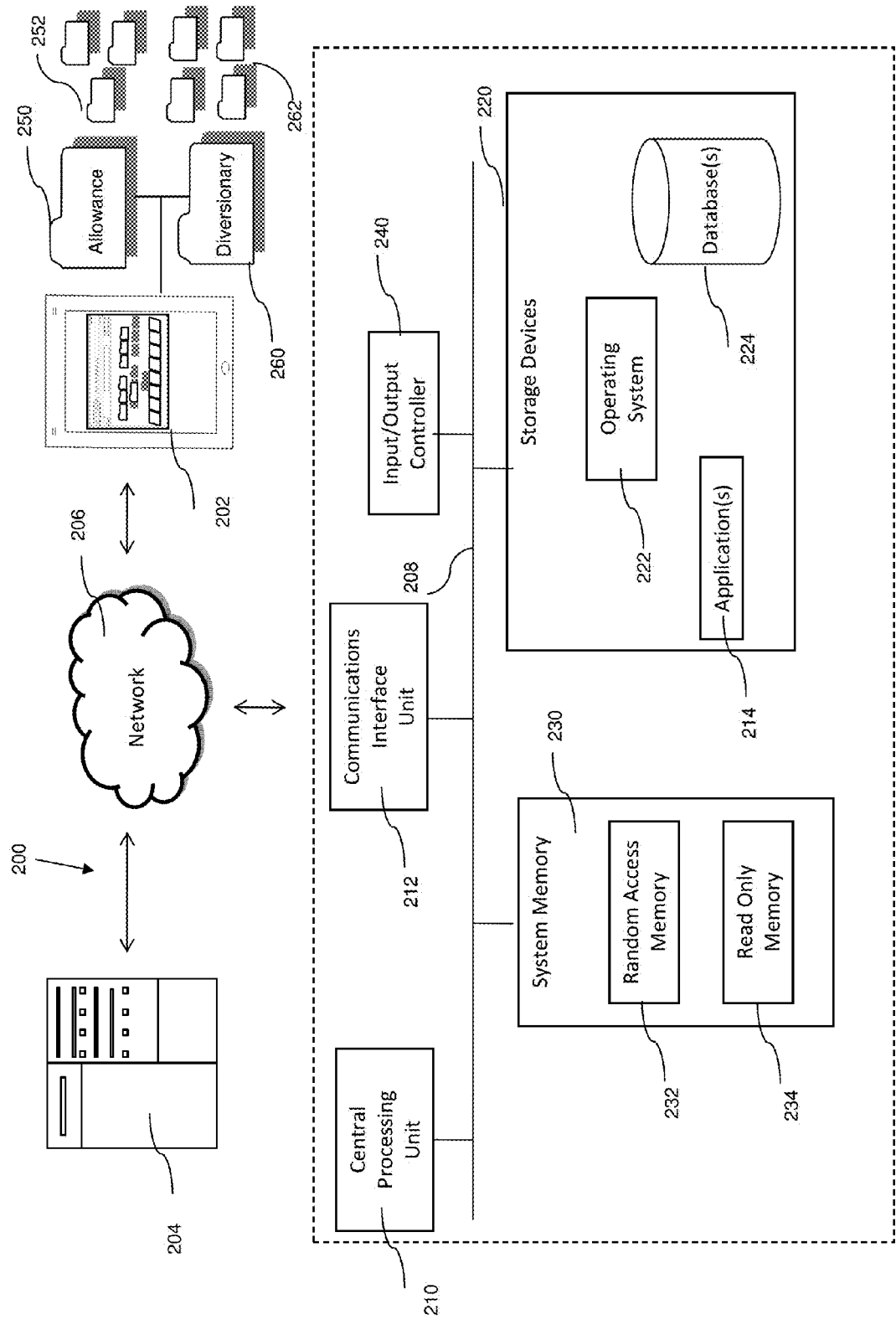
FIG. 2 shows an exemplary system that may be used for the management of allowance and diversionary accounts.

Referring to FIG. 2, an exemplary computer system 200 for use in an implementation of the invention will now be described. Computer system 200 may be configured to perform financial processing and management of financial information and transactions for one or more users, clients or customers 202. System 200 may interface with an insurance/financial services company system or server 204 via a network 206. In computer system 200, a central processing unit or processor 210 executes instructions contained in programs such as financial management application program 214, stored in storage devices 220. Processor 210 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 220 may include suitable media, such as optical or magnetic disks, fixed disks with magnetic storage (hard drives), tapes accessed by tape drives, and other storage media. Processor 210 communicates, such as through bus 208 and/or other data channels, with communications interface unit 212, storage devices 220, system memory 230, and input/output controller 240. System memory 230 may further include a random access memory 232 and a read only memory 234. Random access memory 232 may store instructions in the form of computer code provided by application 214 to implement the present invention. System 200 further includes an input/output controller 240 that may communicate with processor 210 to receive data from user inputs such as pointing devices, touch screens, audio inputs and keyboards, and may provide data to outputs, such as data to video drivers for formatting on displays, and data to audio devices.

Storage devices 220 are configured to exchange data with processor 210, and may store programs containing processor-executable instructions, and values of variables for use by such programs. Processor 210 is configured to access data from storage devices 220, which may include connecting to storage devices 220 and obtain data or read data from the storage devices, or place data into the storage devices. Storage devices 220 may include local and network accessible mass storage devices. Storage devices 220 may include media for storing operating system 222 and mass storage devices such as storage 224 for storing data related to short term and long term financial transactions and goals related to the customers. Such data may include purchase information, savings and checking information, goals, product information, and other relevant data. In an embodiment, inputs may include user interfaces, including workstations having keyboards, touch screens, pointing devices such as mice, or other user input devices, connected via networked communications to processor 210. Communications interface unit 212 may communicate via network 206 with other financial services/insurance company computer systems such as financial services/insurance company system servers 204 as well as other servers, computer systems of agents, financial advisors, customers, remote sources of data, and with systems for implementing instructions output by processor 210. Insurance/financial services company server 204 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Network 206 may be or include wired or wireless local area networks and wide area networks, and over communications between networks, including over the Internet. One or more public cloud, private cloud, hybrid cloud and cloud-like networks may also be implemented, for example, to handle and conduct processing of one or more transactions or calculations of the present invention, including re-balancing transactions. Cloud based computing may be used herein to handle any one or more of the application, storage and connectivity requirements of the present invention. Furthermore, any suitable data and communication protocols may be employed to accomplish the teachings of the present invention.

With reference still to FIG. 2, in operation system 200 is used for efficiently and managing financial data related to an allowance account and a diversionary account for one or more users. Communications interface 212 is used for receiving user data related to a plurality of allowance account and diversionary account designations whereby each designation corresponds to at least one spending or allowance related sub-account and/or one savings or diversionary related sub-account. In other embodiments, the allowance account may be associated with a money market type of account having check/debit card privileges and the diversionary account may associated with a retirement or stock type fund account. Each designation further has a user specified priority rating associated with each sub-account relative to the other sub-accounts. As discussed in more detail later herein, the initial priorities may be designated by a user or the priorities may default to certain conventional levels. Data storage device 220 is used for storing the received data related to the plurality of allowance account and diversionary account designations. Computer processor 210 executes program instructions, such as provided by application 214 to receive, via the communications interface 212, data related to a third party financial transaction, such as a purchase transaction for certain goods or services. Processor 210 compares the third party financial transaction data with transaction data, such as may be stored in database 224 of third party financial transactions associated with the user. Database 224 may include transaction data such as historical transaction data from the user or other third parties. Database 224 may also include information correlating one or more third parties with certain types of financial transaction. Such data may be acquired through a third party registration system whereby third parties register with the system to provide information on what type of transactions they are involved with. For example, certain third parties may register as entertainment, dining, utility, home, auto, personal expense or other types of categories. Consequently, when certain transaction data comes in from this pre-registered third party, the processor 210 is able to correlate the transaction data with the certain type of purchase automatically. Processor 210 correlates the third party financial transaction data with at least one of the plurality of sub-accounts 252, 262 based on analysis of the transaction data and determines one or more allowance account and diversionary account rebalancing transactions based upon the correlated sub-account for the third party financial transaction and the associated priority rating of the sub-account. Communications interface 212 may be used to transmit data related to the rebalancing transactions to a financial account management system 204 for execution. Execution may include the offering, buying and/or selling of one or more financial service/insurance products in conformance with the user's risk tolerance, account priorities and transaction data. Data related to rebalancing financial transactions, such as data related to recommended transactions, may be transmitted to a user for acceptance, such as via a display on device 202, or other user interface, to prompt a user to accept or reject a recommended transaction. Upon receipt of user input via device 202 of data indicative of user acceptance of a financial rebalancing transaction, the system may be configured to proceed with the transaction. Absent receipt of data indicative of user acceptance of a financial rebalancing transaction, the system is configured not to proceed with the transaction. Upon receipt of data indicative of user rejection of recommended transaction, the system may be configured to display data such as additional explanatory text or images, recommendations to contact a human broker, agent or financial advisor, or the system may be configured to alter sub-account priorities and based on the altered priorities, generate a new financial rebalancing transaction. For example, upon receipt of data indicative of user rejection of a recommendation of transfer from a first diversionary sub-account to fund an overage in an allowance sub-account, the system may increase the priority rating of the first diversionary sub-account or reduce the priority rating of one or more second diversionary sub-accounts, and employing the revised priority rating data, generate a new recommendation including a transfer from the one or more second diversionary accounts. The new recommendation and a request for acceptance or rejection may then be displayed to the user such as through device 202.

Referring still to FIG. 2, in operation, a user 202 designates at least one allowance account(s) 250, a number of associated allowance sub-account(s) 252, at least one diversionary account 260 and a number of associated diversionary sub-account(s) 262. Each account and sub-account(s) may have one or more goals and/or priority ratings associated with them, for example, an allowance sub-account may be designated as a utilities related account and be designated a high priority account and conversely an allowance sub-account may be designated as an entertainment related account and be associated a low priority rating. An "allowance sub-account" may also be referred to herein as a "spending sub-account" or a "spending related sub-account." By way of further example, a diversionary sub-account may be designated as a house related account and be designated a high priority account and a diversionary sub-account may be designated as a vacation related account and be given a medium priority rating. A "diversionary sub-account" may also be referred to herein as a "savings sub-account" or a "savings related sub-account." In operation, system 200 helps user 202 manage and administrate their allowance account 250 and diversionary account 260 by managing shortfalls, overages, excesses and rebalancing between the various sub-accounts associated with the allowance account 250 and diversionary account 260. For example, in one embodiment, all excesses will be allocated to the highest priority sub-accounts in decreasing order. For example, if an excess is determined to exist in one or more sub-accounts, such as a allowance sub-account, the excess amount may be diverted or re-allocated to a diversionary sub-account with the highest relative priority rating. An excess may be determined on a current basis, such as based on funds remaining and unspent in an allowance sub-account at the end of a period. The time to determine the excess may be selected to be immediately prior to a funding event, such as an allocation of funds received by the user, such as a paycheck amount deposited, to the sub-account. Business rules may provide that a balance in an allowance sub-account immediately prior to a funding event is indicative of an excess. An excess may be determined prospectively by the system, such as by predicting spending for a remainder of a current period, based on stored historical data related to spending by the user for the sub-account, comparing the predicted spending to a current balance, and determining an excess of the current balance over the predicted spending. In another embodiment, all overages or shortfalls will need to be supplemented with funds from the sub-accounts with the lowest relative priorities. The shortfalls and overages can similarly be determined at the end of a period, prospectively, immediately prior to a funding event, or on another basis.

Business rules may provide for a system to determine on a periodic basis, e.g., monthly, weekly or bi-weekly, whether a sub-account has an excess, and then re-allocate. The re-allocation from an allowance sub-account to a diversionary sub-account may cause a system to provide for automated transfer of funds from an account associated with the allowance sub-account, e.g., a checking account, to an account associated with a diversionary sub-account, e.g., a savings account, brokerage account, annuity, universal life insurance policy or other savings vehicle. Similarly, on a periodic basis, e.g., a monthly basis coincident with a monthly pay period, any overages in allowance accounts may be corrected by reducing the periodic funding of the lowest priority diversionary sub-account. By way of example, the system determines, at an end of a period, that an allowance sub-account for entertainment has an overage; based on that determination and in accordance with business rules, a scheduled funding to a diversionary sub-account for savings for a home is reduced by the amount of the overage of the allowance sub-account from the prior period.

Figure 3:
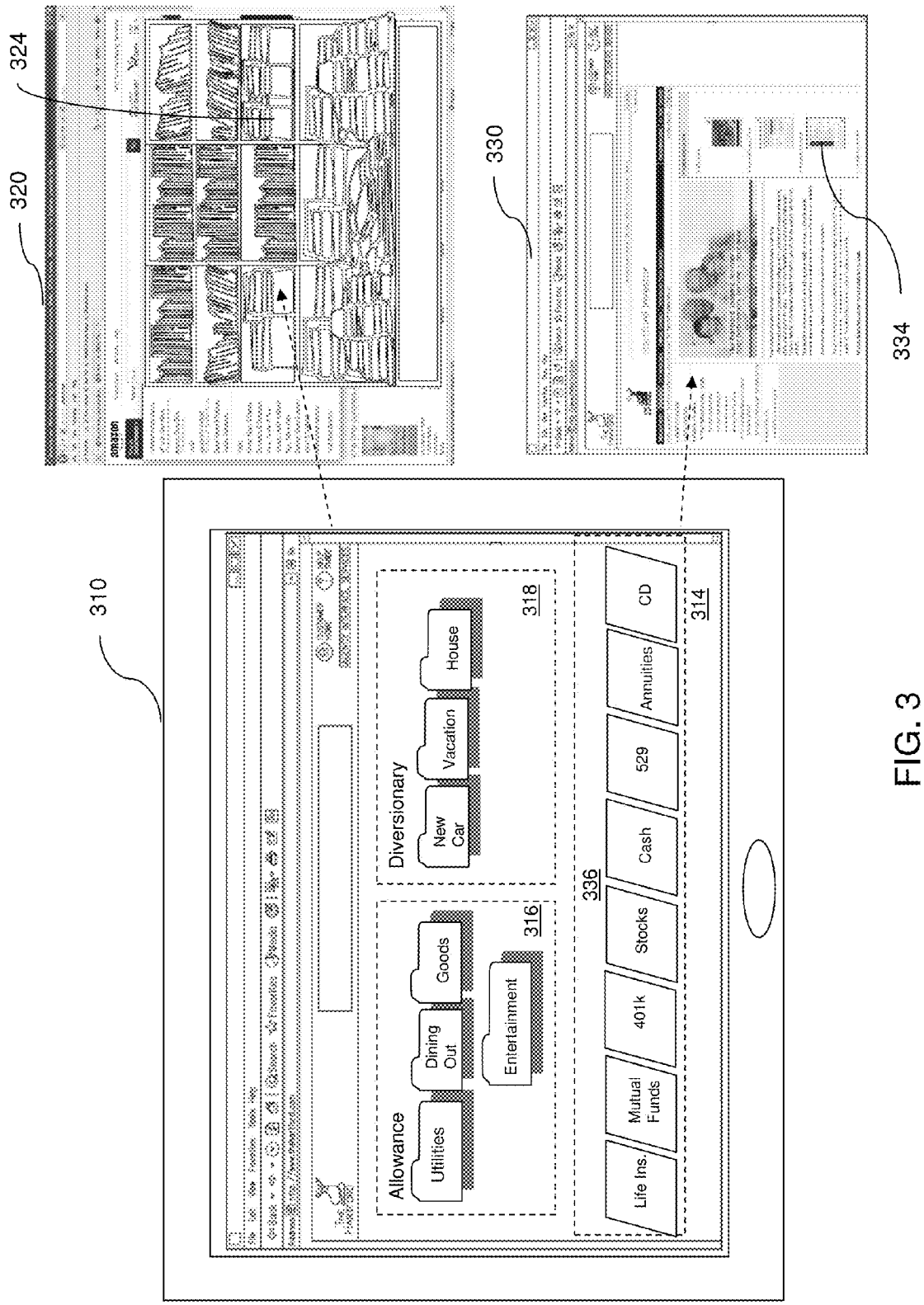
FIG. 3 shows an exemplary system screen of the present invention.

FIG. 3 illustrates an exemplary screen of the present invention as may be displayed among devices shown in FIGS. 1 and 2. In one embodiment, a user operates a device 310, such as a touch screen type device for viewing and accessing information and data related to their allowance and diversionary accounts as described herein. Touch screen device 310 can be an active sensor employing capacitive, resistive, inductive, or other methods, or it can be a passive surface on which touch sensing is accomplished by optical, acoustic, or other similar methods. Device 310 can also be a liquid crystal display (LCD), organic light emitting diode (OLED) display, electroluminescent display, or any other type of small display suitable for mounting in a portable computer or mobile device. Device 310 may be color or monochrome, and may include a backlight capability to enhance readability in various lighting conditions.

In the present invention, device 310 displays a web document 314 for access by a user. Web document 314 may include an allowance account designation area 316 and a diversionary account designation area 318 for creating, designating and managing allowance accounts and diversionary accounts and related sub-accounts. For example, using the web document 314, a user can create or delete certain sub-accounts and re-prioritize the accounts. In one example, a user creates a number of allowance related sub-accounts and a number of diversionary related sub-accounts and assigns relative priorities to each of the sub-accounts. In one instance, a house related sub-account may be given the highest relative priority while an entertainment sub-account may be given the lowest relative priority. In another instance, a house related sub-account may be given the highest relative priority while a new car or automobile related sub-account may be given a medium relative priority. In one embodiment, priorities may be associated with a sub-account using a numbered based system such as from 1-10 with a "1" being the highest priority rating or alternatively a color scale may be used or other similar manner of indicated relative priority of one sub-account to another. In an embodiment, a system may be configured to receive one of a plurality of available priority ratings, or values of priority, to be associated with each sub-account, and the available priority ratings may be arranged on a one-dimensional scale from highest to lowest priority. In one embodiment, priority may be assigned separately relative to sub-accounts in the allowance account and separately relative to sub-account in the diversionary account or conversely, the account priority may be globally assigned between the allowance account and the diversionary account.

In other embodiments, Web document 314 may include a calendaring function that allows the user to calendar certain purchase events such as entertainment events like dinners out, concerts, weddings, weekends away, etc. This information may be used to anticipate certain purchases and adjust priorities and sub-account allocations accordingly. Sub-account allocations may be adjusted forward or backward in time in the same sub-account, using calendar data or otherwise. By way of example, a planned unusually expensive night out for a date after a next scheduled paycheck may be funded by prospectively re-allocating funding for an entertainment sub-account from a current month to a next month. The information may be employed, for example, by the system to anticipate future expenditures in an account together with business rules for generating alerts to a user to cause a user to curtail spending in the entertainment sub-account in the current period.

Device 310 may be in communication with one or more third party entities such as an entity operating a commercial website 320. The user may operate device 310 to purchase an item 324 from website 320 or pay for some service or other commodity such as providing payment for utilities. Based on an analysis of the purchase and/or historical information associated with the user, the purchase may be associated with or correlated with one or more of the sub-accounts, such as sub-account "goods" shown in area 316. Correlation may be accomplished using context sensitive analysis of the transaction data, using information from the entity operating the website or information of historical transactions associated with the user alone, combined, or even with the assistance of a predictive model. The predictive model(s) of the present invention may include one or more of neural networks, Bayesian networks (such as Hidden Markov models), expert systems, decision trees, collections of decision trees, support vector machines, or other systems known in the art for addressing problems with large numbers of variables. In embodiments, the predictive models are trained on prior data and outcomes using a historical database of prior transactions and resulting correlations relating to a same user, different users, or a combination of a same and different users. In embodiments of the present invention, the predictive model may be implemented as part of financial calculation module 114 described with respect to FIG. 1.

Referring again to FIG. 3, the system conducts a review of all the sub-accounts and their relative priority based on the newly categorized or correlated transaction. For example, if the transaction is for the purchase of a personal item such as a large screen television, the system may determine that the sub-account should be correlated to the "goods" sub-account in allowance account area 316. In view of this correlation, the system may determine that the diversionary sub-account for a new car should now be given less priority and the system may reduce the initial priority given to the sub-account by the user. For example, the system may designate that the new car sub-account should be given a medium priority instead of a high priority and then recommend one or more re-balancing actions or products in view of this new prioritization. Device 310 may also be in communication with a financial services/insurance entity operated website 330. Website 330 displays information 334 on one or more insurance/financial services product(s) that have been determined to be suitable for the consumer based on their account priorities and transaction data. It is contemplated that the functionality of website 330 may be integrated within web document 314 such as in a frame, window or other manner so that access to information 334 may be accomplished in a single screen 314 such as shown with respect to icons 336 that provide for viewing and selection of one or more financial services/insurance related products. In one embodiment, the user may drag and drop the appropriate financial service/insurance product icons into the appropriate icons for the subaccounts in the allowance and diversionary areas 316 and 318. For example, the user may select the "CD" (Certificate of Deposit") icon and drag and drop the icon onto the "house" sub-account icon and the system will automatically recommend or even initiate the purchase of the appropriate amount of the CD that matches the user's state priority and timeline. By way of further example, if the user has designated that he/she would like to purchase a house in five years, then the system will recommend or initiate the purchase of a CD with a 5-year maturity date and may also take into account any expenses or fees associated with the product before recommending or initiating the purchase of the product. In one embodiment, the consumer may then begin the purchase or registration process to select one or more of the products based on the financial determination either by interacting with the agent or alternatively directly, such as through screen 334.

In the current example, the user's purchase of the large screen television and a calculated shortfall in the user's overall allowance account may result in the system recommending that one or more of the user's portfolio holdings be sold, such as one or more stocks or mutual funds. Conversely, a lack of purchases or minimal purchases in one month may result in the system recommending or automatically purchasing one or more financial service/insurance products such as life insurance or annuities. In other embodiments, the various screens illustrated in FIG. 3 may be provided on a single device or apparatus such as an agent operated device or apparatus. The user or consumer may interact either locally or remotely with the agent operated device as described with respect to FIG. 1.

In an embodiment, the system may recommend or implement, in connection with a re-balancing transaction, a transfer of funds from one financial product to another financial product, such as from one of the financial products shown as icons 336 to another of the financial products shown as icons 336. The system may cause a graphical representation of a transfer to be displayed, such as by an arrow from a source product icon 336 to a destination product icon 336. The system may further recommend a sale of a financial product or a purchase of a new financial product, based on changes in priorities, such as a purchase of a 529 plan account as a result of a higher priority rating being given to a college savings diversionary sub-account.

Figure 4:
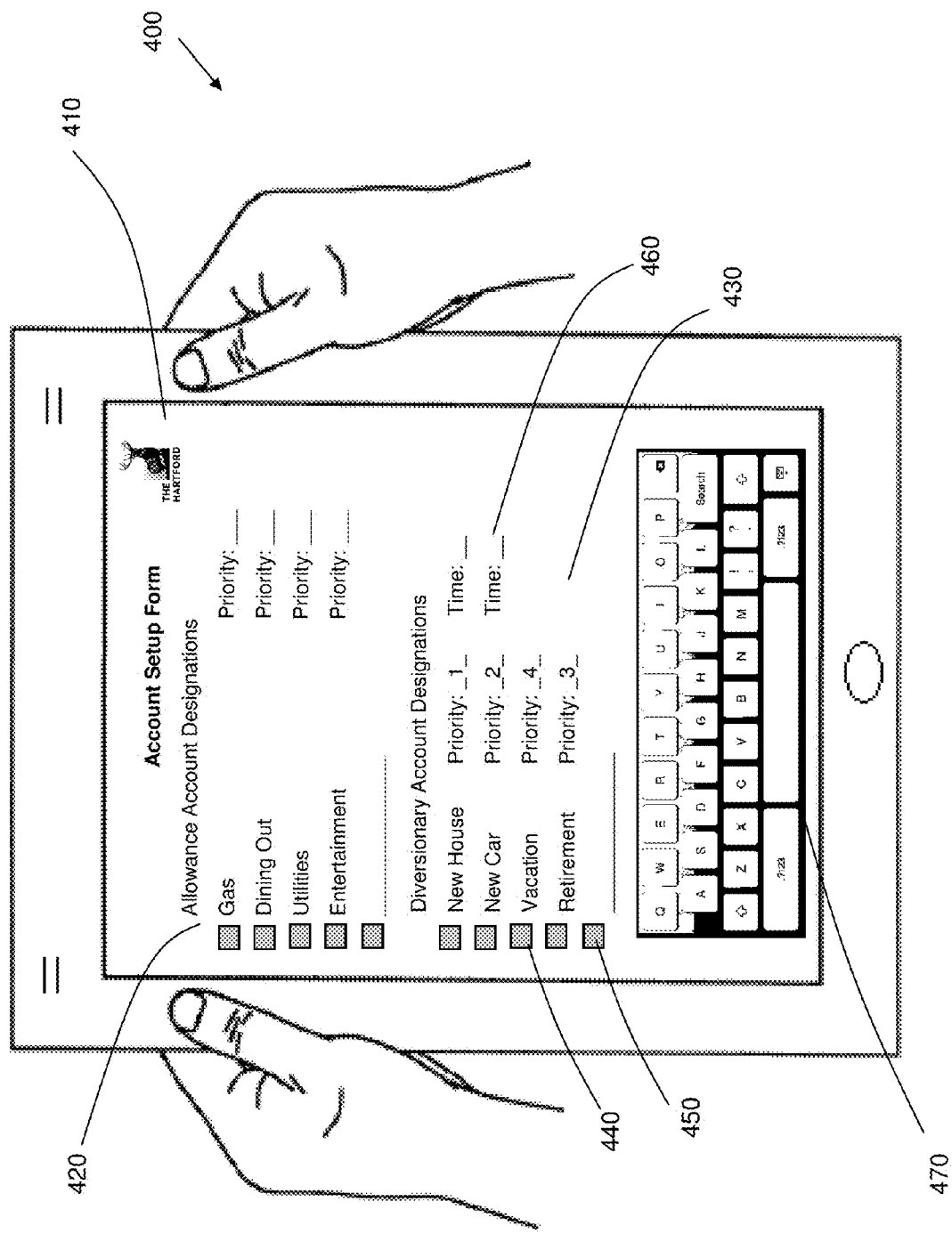
FIG. 4 shows an exemplary system device in operation.

Turning now to FIG. 4, an exemplary user device 400 is illustrated displaying an electronic account setup document 410. Setup document 410 may be generated by the financial data management system 110 shown relative to FIG. 1. Setup document 410 is configured to receive certain information and input on behalf of the user through a series of static and/or dynamically rendered questions provided on user device 400. Such information and input provided by the user in response to the questions is then stored such as in a data storage device described with respect to FIGS. 1 and 2. Setup document 410 is configured to receive input from the user regarding their allowance and diversionary accounts, such as the designation of the various sub-accounts and their relative priorities in an allowance account section 420 and a diversionary account section 430. In other embodiments, setup document 410 may also be used to evaluate the user's investment/financial acumen or knowledge, such as how familiar the user is with insurance products and general investments; the user's tolerance for risk such as on a conservative, moderately conservative, moderately aggressive and aggressive scale; and the user's solvency, such as their income, net worth, source of income for the product, etc. so that the appropriate financial services/insurance product may be selected for them. The user's risk profile can then be used to validate the product selections the user had made.

In operation, the user moves from one form field to another form field such as from field 440 to 450 to complete each selected question displayed in each form field such as designating the name or indicia to identify a sub-account and/or for designating or selecting a priority associated with that sub-account. An electronic pop-up type display may be available in setup form 410 for one or more of the fields to provide additional assistance or clarification with respect to one or more of the form fields if requested by the user through a specified action, such as by double clicking or tapping the relevant question. Setup document 410 may also include one or more areas for the user to indicate a timeframe or timeline associated with a sub-account such as in area 460.

In the present invention, device 400 may be a touch sensitive display that is responsive to a finger, a stylus, etc. for manipulation and completion of form 410. Certain operating circuitry may control or operate device 400 to show different respective images, such as, for example, financial question, text instructions or information, an image of a keypad 470, icons or functions of a graphical user interface (GUI), lists of information, etc., as is known. Keypad 470 may also be a physical keypad having keys or buttons that are positioned on or in the housing or keypad 470 may be formed as an image on device 400.

Figure 5:
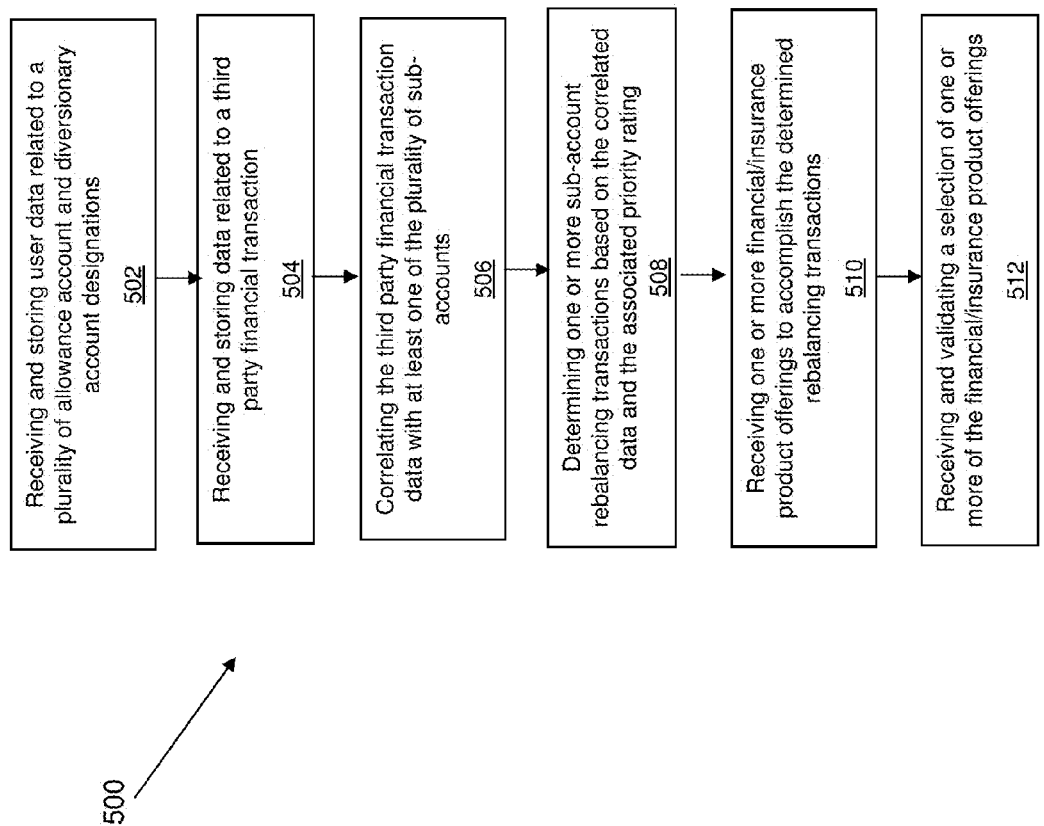
FIG. 5 shows an exemplary method of the present invention.

FIG. 5 shows an example process flow diagram illustrating a method 500 for administering financial-related data associated with an allowance account and a diversionary account using the example architecture 100 of FIG. 1. The method 500 of FIG. 5 may begin with receiving and storing user data related to a plurality of allowance account and diversionary account designations, step 502. In the present invention, each designation corresponds to at least one spending related sub-account or one savings related sub-account and each designation further has an associated priority rating associated with each sub-account. Method 500 further includes the step of receiving and storing data related to a third party financial transaction, step 504. Method 500 continues with correlating the third party financial transaction data with at least one of the plurality of sub-accounts based on the comparison, step 506. Correlation may be accomplished in a variety of manners including having the user's credit card, debit card or other payment method linked to the system so that purchase information or data is automatically received by the system and categorized in one or more sub-accounts. Additionally, certain vendors or businesses may provide identifying information to the user or system for each financial transaction to help the system correlate the transaction to a certain sub-account. In the present invention, correlating the third party financial transaction data with at least one of the plurality of sub-accounts based on the comparison may also include accessing a predictive model that uses, for example, a regression analysis or other statistical technique to make the correlation between the transaction and the associated sub-account.

Method 500 continues with determining one or more sub-account rebalancing transactions based on the correlated data and the associated priority rating, step 508. In the present invention, the rebalancing transactions comprise moving funds from at least one spending related sub-account to at least one savings related sub-account. The rebalancing transactions may also include moving funds between financial accounts associated with the respective sub-accounts. Of course, the fund movements between financial accounts may be performed on a periodic basis net of all rebalancing between sub-accounts associated with two financial accounts. Rebalancing may also include modifying the priority of one or more sub-accounts such as lowering the priority of certain sub-accounts and/or raising the priority of other sub-accounts. Method 500 proceeds with receiving one or more financial/insurance product offerings to accomplish the determined rebalancing transactions, step 510 and further with receiving and validating a selection of one or more of the financial/insurance product offerings, step 512. In some embodiments, validation may be performed by reconciling the user's risk profile or risk tolerances with the selected financial/insurance product offerings. The system may have access to stored data indicative of the user's risk profile or risk tolerances and rules indicative of permitted and/or disallowed associations of financial/insurance product offerings and risk profile values or risk tolerance values.

In some embodiments of the present invention, the user data may be provided related to the plurality of allowance account and diversionary account designations via a mobile device app, such as an app running on a device described and illustrated with respect to FIG. 4 herein.

Figure 6:
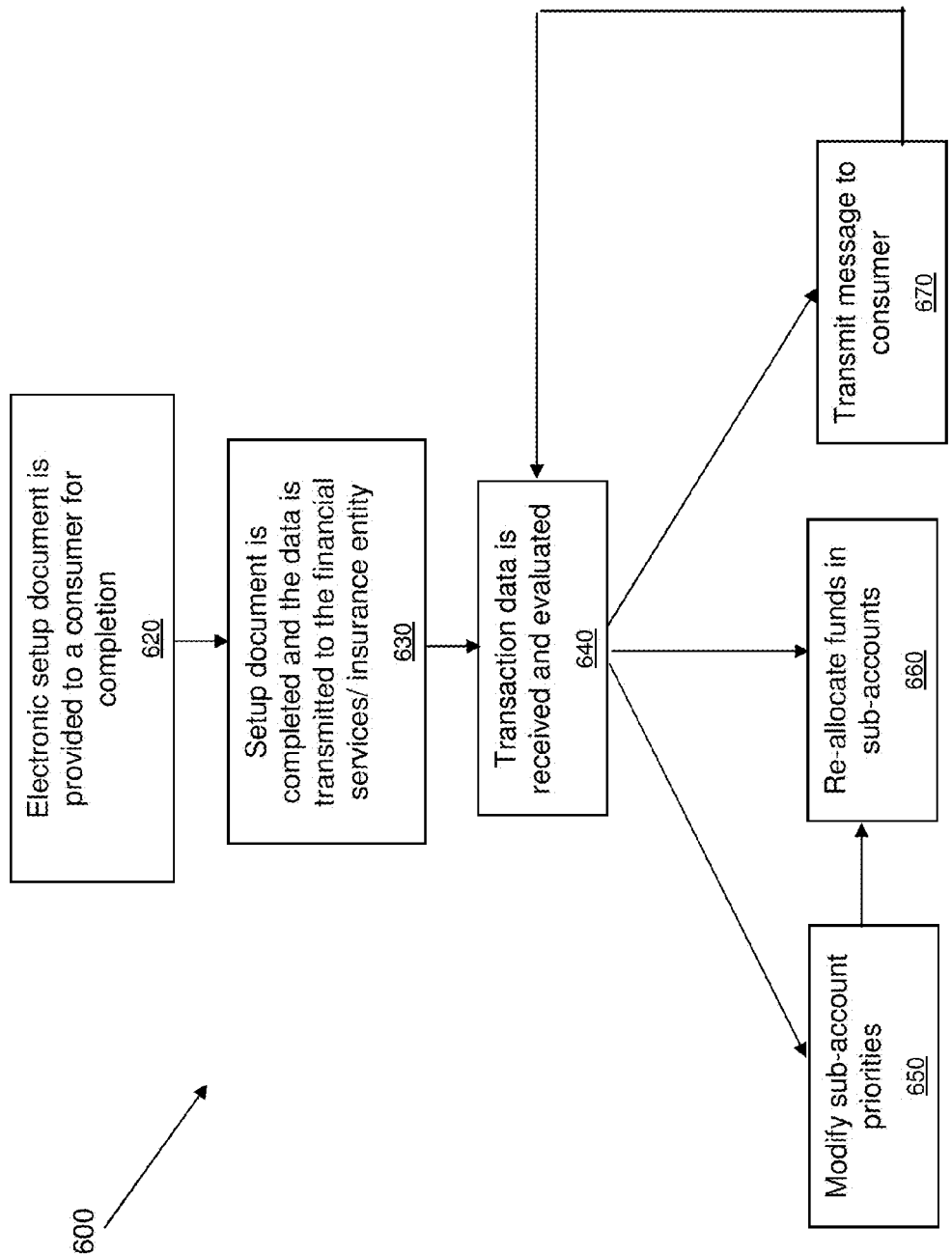
FIG. 6 shows another exemplary method of the present invention.

FIG. 6 shows a process flow diagram illustrating another computer implemented method 600 of the present invention. In an embodiment, an electronic setup document is provided to a consumer for completion, step 620. Electronic setup document may be rendered via web system 120 such as described with respect to FIG. 1 and FIG. 4. The setup document may be completed by a user and the data is transmitted to the financials services/insurance entity, step 630. Certain transaction data is received and evaluated, step 640, such as a consumer goods purchase transaction. Based on this transaction data, one or more of the user's sub account priorities may be modified, step 650. Additionally, or conversely, funds in one or more of the user's sub-accounts may be re-allocated, step 660. For example, funds from an allowance sub-account may be re-allocated to a diversionary sub-account and vice versa. Additionally, the transaction data may result in a message being transmitted to the consumer, step 670. Such a message may be to provide additional information about the transaction if the historical data matching and/or predictive model analysis do not yield sufficient results to categorize or correlate the transaction with a certain sub-account. A message may also be an alert or warning to the user about certain financial conditions related to their sub-accounts such as actual or anticipated shortfalls or excesses. This messaging function may be linked with one or more third party data sources such as a GPS based system or a location based check in service that may detect certain triggering conditions. For example, if such a GPS based system detects that the user is at a car dealer and the user's sub-accounts are not appropriately allocated or funded for such a purchase, the system may send an alert to the user related to this condition. Similarly, if a user employs a location based check in service, such as one implemented as an application on device 132, the system may be configured to receive data from the check in service indicative of the establishment where the user has checked in. The system may be configured to associate a particular establishment or classes of establishments with a sub-account, and retrieve data related to the sub-account, such as available balances, and provide an alert or other data. By way of example, the user may employ a check in service to check in at a restaurant; the check in data is received by the system, which associates a restaurant with a dining out sub-account, accesses a current dining out subaccount available balance, and provides a user alert indicative of an available amount to spend at the restaurant without a need to re-balance.

The messages may be associated with predictive calculations carried out by the system. For example, on a periodic basis, the system may predict expenditures in one or more or each allowance sub-account for a remainder of a current period. The prediction may be based on historical data, calendar data, GPS data, check in service data, or other data. The predicted expenditures may be compared to a current balance. Responsive to determining that a predicted expenditure for a remainder of a current period exceeds a current sub-account balance, the system may generate a message identifying the prediction. The message may identify the sub-account and the anticipated expenditures, for example. The message may identify other sub-accounts, such as other allowance sub-accounts that may be used to correct the anticipated excess, if other allowance sub-accounts are predicted to have excesses. Alternatively or in addition, the message may identify one or more diversionary sub-accounts, employing priority data, which would be debited to balance the anticipated overage in the allowance sub-account. These messages provide a user an opportunity to alter customary spending in order to meet savings goals.

One or more steps of method 600 may be implemented as computer program instructions provided on a non-transitory computer readable medium for execution by one or more processors. As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Figure 7:
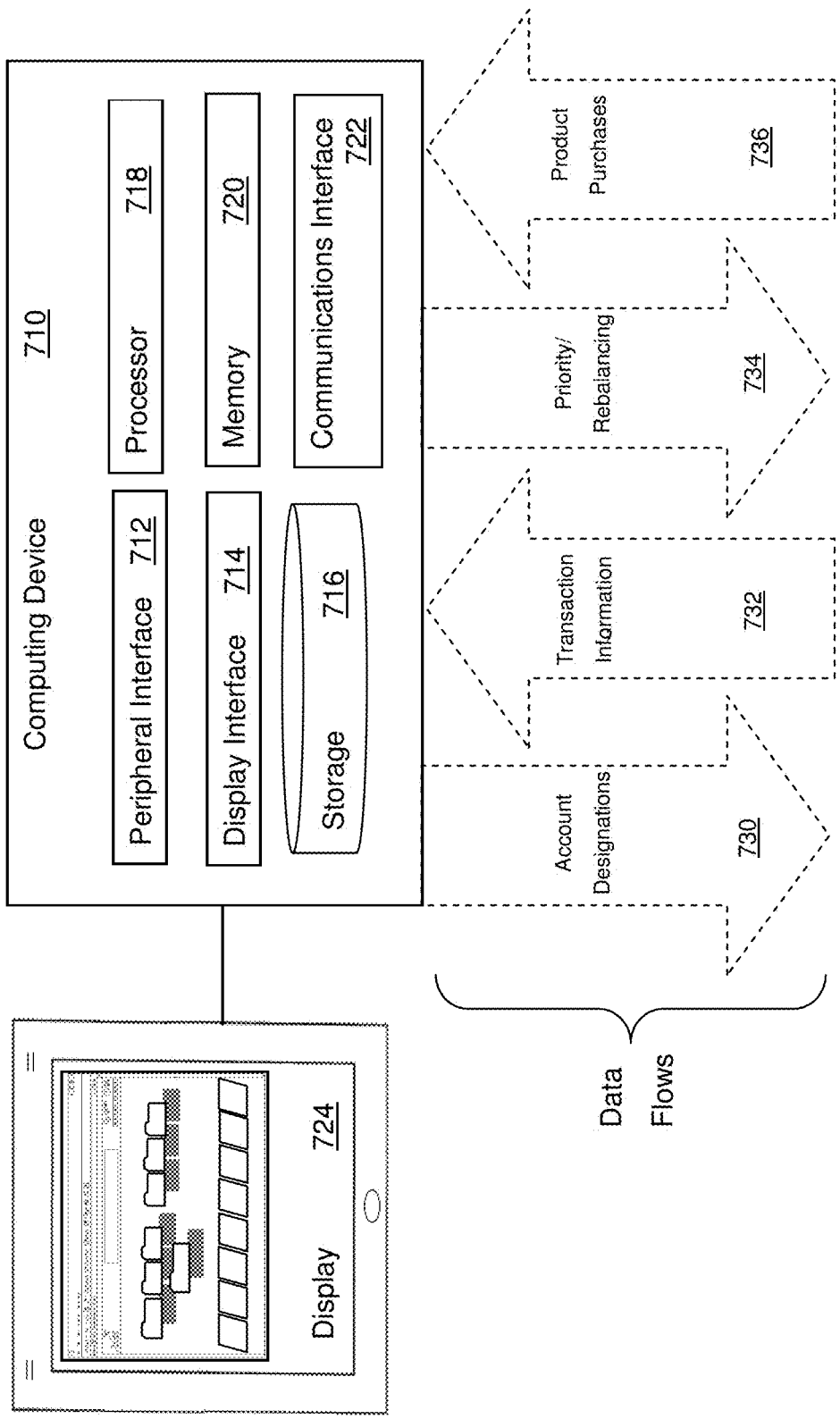
FIG. 7 shows another exemplary device of the present invention.

FIG. 7 shows an example computing device 710 that may be used to implement features describe above. The computing device 710 may include a peripheral device interface 712, display device interface 714, a storage device 716, a processor 718, a memory device 720, and a communication interface 722. Computing device may be coupled to a display device 724, which may be separately coupled to or included within the computing device 710. In operation, computing device 710 is configured to receive and transmit a number of data flows via communications interface 722 including, for example, data related account and sub-account designations 730, transaction information 732, priority/rebalancing information 734 and product purchase information 736.

The peripheral device interface 712 may be an interface configured to communicate with one or more peripheral devices. The peripheral device interface 712 may operate using a technology such as Universal Serial Bus (USB), PS/2, Bluetooth, infrared, serial port, parallel port, and/or other appropriate technology. The peripheral device interface 712 may, for example, receive input data from an input device such as a keyboard, a mouse, a trackball, a touch screen, a touch pad, a stylus pad, and/or other device. Alternatively or additionally, the peripheral device interface 712 may communicate output data to a printer that is attached to the computing device 710 via the peripheral device interface 712. The printer may be configured to output one or more periodic reports displaying product recommendations, purchase information, a percentage shortfall or overage for one or more of the subaccounts of the present invention and other related information of the present invention. Thus the system is configured to generate and issue one or more periodic reports, or reports triggered based on user requests or events, displaying one or more of product recommendations, purchase information, a percentage shortfall or overage for one or more of the subaccounts of the present invention and other related information of the present invention.

The display device interface 714 may be an interface configured to communicate data to display device 724. The display device 724 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 714 may operate using technology such as Video Graphics Array (VGA), Super VGA (S-VGA), Digital Visual Interface (DVI), High-Definition Multimedia Interface (HDMI), or other appropriate technology. The display device interface 714 may communicate display data from the processor 718 to the display device 724 for display by the display device 724. As shown in FIG. 7, the display device 724 may be external to the computing device 710, and coupled to the computing device 710 via the display device interface 714. Alternatively, the display device 724 may be included in the computing device 700. Display device 724 may be configured for displaying reports such purchase history, rebalancing transaction history, and/or a report depicting a percentage shortfall or overage for one or more of the subaccounts of the present invention.

The memory device 720 may be or include a device such as a Dynamic Random Access Memory (D-RAM), Static RAM (S-RAM), or other RAM or a flash memory. The storage device 716 may be or include a hard disk, a magneto-optical medium, an optical medium such as a CD-ROM, a digital versatile disk (DVDs), or Blu-Ray disc (BD), or other type of device for electronic data storage.

The communication interface 722 may be, for example, a communications port, a wired transceiver, a wireless transceiver, and/or a network card. The communication interface 722 may be capable of communicating using technologies such as Ethernet, fiber optics, microwave, xDSL (Digital Subscriber Line), Wireless Local Area Network (WLAN) technology, wireless cellular technology, and/or any other appropriate technology.

An instance of the computing device 710 of FIG. 7 may be configured to perform any feature or any combination of features described above as performed by the consumer client device 130 or 132 as described with respect to FIG. 1. In such an instance, the memory device 720 and/or the storage device 716 may store instructions which, when executed by the processor 718, cause the processor 718 to perform any feature or any combination of features described above as performed by the web browser module 134. Alternatively or additionally, in such an instance, each or any of the features described above as performed by the web browser module 134 may be performed by the processor 718 in conjunction with peripheral device interface 712, display device interface 714, and/or storage device 716, memory device 720, and communication interface 722.

Alternatively or additionally, an instance of the computing device 710 may be configured to perform any feature or any combination of features described above as performed by the financial data management system 110. In such an instance, the memory device 720 and/or the storage device 716 may store instructions which, when executed by the processor 718, cause the processor 718 to perform any feature or any combination of features described above as performed by the interface module 112 and/or the financial calculation module 114. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the intermediary device 140. In such an instance, the memory device 720 and/or the storage device 716 may store instructions which, when executed by the processor 718, cause the processor 718 to perform any feature or any combination of features described above as performed by the client module 142. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the web site system 120. In such an instance, the memory device 720 and/or the storage device 716 may store instructions which, when executed by the processor 718, cause the processor 718 to perform any feature or any combination of features described above as performed by the financial web application module 122 and/or the HTTP server module 124. In such an instance, the processor 718 may perform the feature or combination of features in conjunction with the memory device 720, communication interface 722, peripheral device interface 712, display device interface 714, and/or storage device 716.

Although FIG. 7 shows that the computing device 710 includes a single processor 718, single memory device 720, single communication interface 722, single peripheral device interface 712, single display device interface 714, and single storage device 716, the computing device may include multiples of each or any combination of these components 712, 714, 716, 718, 720, and 722 and may be configured to perform analogous functionality to that described above.

Figure 8:
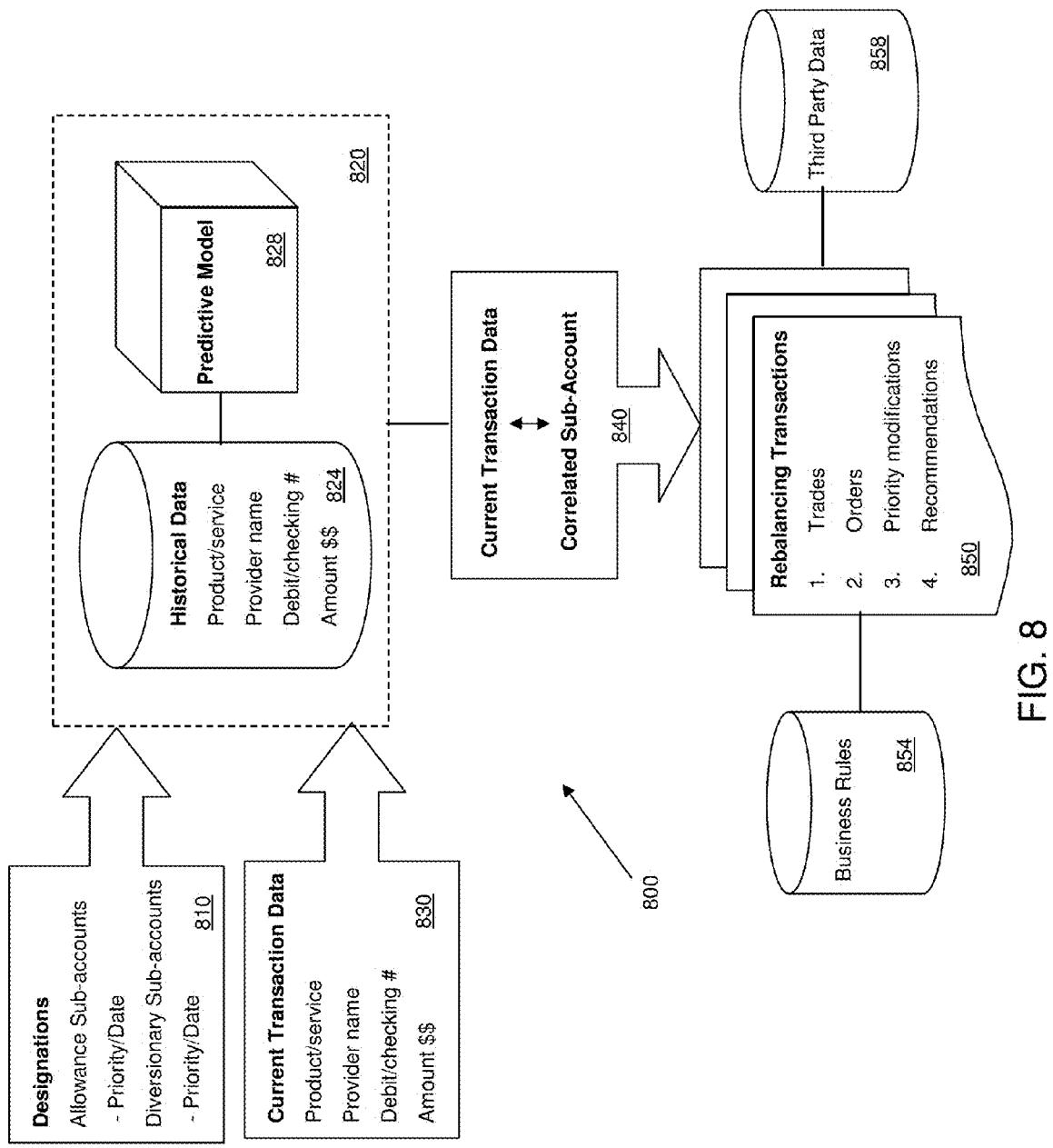
FIG. 8 shows exemplary data flows of the present invention.

FIG. 8 illustrates a number of exemplary data flows of the present invention. Generally, one or more users may provide data 810 related to their allowance account and diversionary account designations or assignments to a computer system 820. Computer system 820 may include a database 824 of certain product/service data, provider name data, debit/checking number data and amount data such as may be related to one or more financial transactions associated with the user. Computer system 820 may also include one or more predictive models 828. Computer system 820 is configured to receive transaction data 830 that may include one or more data points including a product/service identifier, a provider or store name, payment method data such as a debit/checking number and amount information. For example, if the user pays their utility bill, information transmitted related to the payment may include a data stream such as "Electric Bill; Utility Company XXYY; Account 1234; $150" to identify the financial transaction. The user designation data 810 and transaction data 830 is processed via computer system 820 to output correlation data 840 relating the current transaction data to one or more sub-accounts. Based on this correlation data 840, one or more rebalancing transaction data 850 is generated. Rebalancing transaction data 850 may include certain trade data, order data, priority modification data and recommendation data. For example, based on the utility based financial transaction in the above example, rebalancing data 850 may include data related to increasing the priority of a house related sub-account associated with the user and the recommendation to purchase one more high growth funds. System analysis may result in the system recommending changing designations of funding, or recommending changes in designations of funding, such as based on repeated overages in a sub-account such as a utility sub-account. The system may apply business rules to recommend ameliorative steps, such as recommending that the user establish a diversionary sub-account to accumulate funds for home improvements to enhance energy efficiency and reduce utility bills, or recommend use of credit facilities to fund current home improvements to reduce expenditures in utility sub-accounts. Other context based purchases may also result in the user's priorities and funds being reallocated in the present invention. In some embodiments, rebalancing transaction data may include input from one or more business rules 854 and one or more sources of third party data 858. For example, third party data 858 may include data related to the social network activity of a user. Social network data may encompass the time the user spends on certain sites, the substantive content of such sites and the reliability/rating of such sites. For example, if third party data 858 contained data showing that the user has been recently browsing certain house related sites or real estate related social networks, this may be viewed as an indication to increase the priority of and/or amount of funding directed to the house related sub-account and also decrease or lower the priority of other accounts such as their new car sub-account. In other embodiments, if a user is spending a considerable amount of time chatting online with acquaintances in a foreign country through a social networking site, then the system may determine that the user's vacation account should be given higher priority. Similarly, GPS data and check in application data may be employed in connection with updating priority and funding amounts; check in application data at car shows and automobile dealerships may cause a higher priority to a new car sub-account. GPS data showing the user in or near new housing developments or home improvement retailers, or check in application data showing the user in home improvement retailers or real estate developer locations may cause the system to designate a higher priority and funding to a housing sub-account.

In the present invention, other technologies may be utilized to facilitate the operation of the system including the use of two-dimensional bar codes or Quick Response codes to assist in transaction identification, correlation and associated messaging.

The terms "user," "customer" and "client" are employed interchangeably herein to designate a user of the services. The user of the services may be one individual user having a single set of allowance accounts and diversionary accounts. User identifications may be associated with a given user. A user may also include multiple individuals, such as a couple.

Spending sub-accounts may be linked to accounts having sources of funds, such as a checking account maintained at a financial institution, such as a third party financial institution such as a bank or credit union, money market accounts having check writing privileges, and the like. The account may be maintained at the same financial institution that provides the system and associated services, a related entity, or with a third party financial institution such as an unrelated bank. Diversionary sub-accounts may be linked to savings or investment related accounts such as bank savings accounts, brokerage accounts, mutual fund accounts, education savings accounts (such as 529 plan accounts), retirement accounts, deferred annuity accounts during the accumulation phase, certificates of deposit and other accounts and instruments suitable for relatively long term investment or savings. The distinction between short term spending accounts may be that spending accounts are for expenditures made on a monthly, quarterly or annual basis, and that savings accounts are for expenditures planned for on a longer time period. For example, the spending accounts and allowance sub-accounts may be for monthly expenditures, and anything planned on a longer time frame than one month, such as an annual or semi-annual vacation, may be for savings account and diversionary sub-accounts.

Although the methods and features described above with reference to FIGS. 1-8 are described above as performed using the example architecture 100 of FIG. 1 and the example system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described above with reference to FIGS. 1-8 may be used alone without the other features and elements or in various combinations with or without other features and elements. Sub-elements of the methods and features described above with reference to FIGS. 1-8 may be performed in any arbitrary order (including concurrently), in any combination or sub-combination.

What is claimed is:

1. A system for managing financial data related to an allowance account and a diversionary account for one or more users, comprising:
   a communications interface for receiving user data related to a plurality of allowance account and diversionary account designations, each allowance account designation corresponding to at least one spending related sub-account and each diversionary account designation corresponding to at least one savings related sub-account, each spending and savings related sub-account further having an associated priority rating provided by the user, at least a first of the savings related sub-accounts being linked to one of a bank savings account, brokerage account, mutual fund account, education savings account, retirement account, deferred annuity account during an accumulation phase, and certificate of deposit account, and a second of the savings related sub-accounts being linked to another one of a bank savings account, brokerage account, mutual fund account, education savings account, retirement account, deferred annuity account during an accumulation phase, and certificate of deposit account;
   a data storage device configured to store the received user data related to the plurality of allowance account and diversionary account designations;
   a computer processor configured to execute program instructions to:
   receive, via the communications interface, data related to a third party financial transaction;
   correlate the third party financial transaction data with at least one of the plurality of spending and savings related sub-accounts;

determine one or more allowance account and diversionary account rebalancing transactions based upon the correlated sub-account for the third party financial transaction and the associated priority rating of the sub-account; and transmit data related to the one or more allowance account and diversionary account rebalancing transactions to a financial account management system for execution;

wherein responsive to the one or more allowance account and diversionary account rebalancing transactions comprising re-allocation from one of the spending related sub-accounts to the first savings related sub-account, the data transmitted to the financial account management system for execution comprising data for automated transfer of funds from a debit checking account linked to the spending related sub-account to the account linked to the first savings related sub-account.

2. The system of claim 1, wherein the computer processor is further configured to execute program instructions to interface with a predictive model to correlate the third party financial transaction data with at least one of the plurality of sub-accounts.

3. The system of claim 2, wherein the predictive model includes one or more of a neural network, a Bayesian network, and an expert system.

4. The system of claim 1, wherein the computer processor is further configured to execute program instructions to use at least in part social network information to determine one or more of the rebalancing transactions.

5. The system of claim 1, wherein the communications interface is configured to receive one or more offers of one or more financial/insurance products from the financial account management system.

6. The system of claim 1, wherein the computer processor is further configured to execute program instructions to re-prioritize priority ratings for one or more of the spending and savings related sub-accounts based on user input.

7. The system of claim 6, wherein the computer processor is further configured to execute program instructions to re-prioritize the priority ratings according to one or more business rules.

8. The system of claim 1, wherein the spending related sub-account is associated with a personal expense.

9. The system of claim 1, wherein the rebalancing transactions comprise changing the priority rating of at least one sub-account.

10. The system of claim 1, wherein the rebalancing transactions comprise re-allocating funds from one of the spending and savings related sub-accounts to another of the spending and savings related sub-accounts based on the respective associated priority ratings of the sub-accounts.

11. The system of claim 1, wherein the rebalancing transactions comprise re-allocating an excess of funds from at least one spending related sub-account to at least one savings related sub-account.

12. A computer system for managing allowance and diversionary account financial data, comprising:
a processor; and
a memory storage device in communication with the processor;
the processor configured to:
receive via a computer communications network an allowance account based transaction from a third party entity;
access, from the memory storage device data associated with a plurality of allowance and diversionary sub-accounts;
correlate the allowance account based transaction with one or more of the plurality of allowance and diversionary sub-accounts, the data relating to the diversionary sub-accounts comprising data indicative of a first of the diversionary sub-accounts being linked to one of a bank savings account, brokerage account, mutual fund account, education savings account, retirement account, deferred annuity account during an accumulation phase, and certificate of deposit account, and a second of the diversionary sub-accounts being linked to another one of a bank savings account, brokerage account, mutual fund account, education savings account, retirement account, deferred annuity account during an accumulation phase, and certificate of deposit account;

determine, based on the correlation, one or more re-balancing transactions for one or more of the plurality of allowance and diversionary sub-accounts; and provide an output signal containing instructions related to execution of one or more of the re-balancing transactions, the output signal including a request for one or more financial services/insurance products;

wherein responsive to the one or more rebalancing transactions comprising re-allocation from one of the allowance sub-accounts to the first diversionary sub-account, the data transmitted to the financial account management system for execution comprising data for automated transfer of funds from a debit checking account linked to the allowance sub-account to the account linked to the first diversionary sub-account.

13. The computer system of claim 12, wherein the processor is further configured to, in correlating the allowance account based transaction with one or more of the allowance and diversionary sub-accounts, access at least one of a social network, a predictive model and a historical transaction database.

14. The computer system of claim 12, wherein one or more of the re-balancing transactions is conducted within a cloud based processing network.

15. The computer system of claim 12, wherein the processor is further configured to issue one or more reports displaying a percentage shortfall or overage for one or more of the plurality of allowance and diversionary sub-accounts.

16. The computer system of claim 12, wherein the computer communications network is configured for transmitting a request for acceptance for one or more of the re-balancing transactions.

17. A computer-implemented method for administering financial-related data associated with an allowance account and a diversionary account, comprising:
receiving, via a communications interface, user data related to a plurality of allowance account and diversionary account designations, each one of the plurality of allowance account and diversionary account designations corresponding to at least one of a plurality of sub-accounts and each one of the plurality of allowance account and diversionary account designations further having an associated priority rating associated with each one of the plurality of sub-accounts;
storing, via a data storage device the received user data related to the plurality of allowance and diversionary account designations;
receiving, via the communications interface, data related to a third party financial transaction;
storing, via a data storage device, the data related to the third party financial transaction;
correlating, via a computer processor, the third party financial transaction data with at least one of the plurality of sub-accounts;

determining, via the computer processor, one or more sub-account rebalancing transactions based on the correlation of the third party financial transaction data and the at least one of the plurality of sub-accounts and the priority rating associated with the at least one of the plurality of sub-accounts;

receiving, via the communications interface, one or more financial product recommendations to accomplish the determined rebalancing transactions;

receiving a selection of one or more financial product recommendations; and validating the selection of the one or more financial product recommendations based on user risk data and rules indicative of associations between the one or more financial products and risk data values.

18. The computer-implemented method of claim 17, wherein correlating, via the computer processor, the third party financial transaction data with at least one of the plurality of sub-accounts comprises accessing a predictive model.

* * * * *